United States Patent Office 3,391,097
Patented July 2, 1968

3,391,097
EPOXY RESINS FROM 1,1'-METHYLENE BIS(5-SUBSTITUTED HYDANTOIN)
Stanley C. Williamson, Red Bank, N.J., assignor to Oakite Products, Inc., New York, N.Y., a corporation of New York
No Drawing. Continuation-in-part of application Ser. No. 447,882, Apr. 13, 1965. This application Aug. 10, 1966, Ser. No. 571,420
32 Claims. (Cl. 260—18)

ABSTRACT OF THE DISCLOSURE

Clear, non-yellowing epoxy resins are prepared by the reaction of an epihalohydrin and a 1,1'-methylene bis (5-substituted hydantoin) in an aqueous alkaline medium. Conventional epoxy resin cures of these materials as well as formation of air drying fatty esters are contemplated.

This application is a continuation-in-part of my co-pending application Ser. No. 447,882 filed Apr. 13, 1965, now abandoned, which in turn is a continuation-in-part of my now abandoned but then co-pending application Ser. No. 26,938 filed May 5, 1960.

This invention is that of a new class of epoxy resins produced by reacting (i) a 1,2-vicinal epihalohydrin of an aliphatic polyol having from 3 to 6 carbon atoms, with (ii) a heterocyclic compound more specifically a methylene bis(5-mono-, or 5,5-disubstituted hydantoin). Also part of the invention is the preparation of these resins, and also certain of their ester derivatives and preparation thereof.

The hitherto available cured glycidyl ether and bisphenol A types of epoxy resins manifest certain limitations in their applicability. For example, these earlier resins do not exhibit water-dispersibility, either alone or to a useful extent with water-miscible solvents. Moreover, uncured bisphenol A type epoxy resins not too infrequently are yellow and hazy; and the cured resin manifests a pronounced tendency toward color change on aging.

The resins of this invention, obtained by condensation between an aforesaid halohydrin and a methylene bis(5-substituted hydantoin), lack such limitations. Thus, while the form viscous liquid to hard resins of the invention dissolve in some aromatic solvents admixed with an aliphatic oxygen-containing solvent, e.g. equal parts of toluene and of 50% aqueous isopropanol, and xylene with methyl isobutyl ketone or methyl ethyl ketone or mixtures of these ketones, they are soluble in many polar solvents, and show latent solubility, i.e. can be dispersed, in aqueous media with water-miscible solvents. These resins ordinarily are clear, colorless and of glassy appearance, and also show notable resistance to color change on aging.

Considered broadly, the epoxy resins of the invention are the reaction products of reacting together (i) a 1,2-vicinal epihalohydrin, as more specifically defined above, with (ii) a methylene bis(5-mono-substituted or 5,5-disubstituted hydantoin), advantageously in the proportions of more than one mole of the halohydrin per mole of the methylene bis(5-substituted hydantoin), and in the presence of an aqueous dispersion of the hydroxide of a metal which forms a water-soluble salt with the hydantoin (by replacement of the active hydrogen linked to its nitrogen) and which hydroxide is inert to the epoxy group of the halohydrin and whose resulting halide is water-soluble so as to remain in solution when the resulting organic resin reaction product precipitates out. That halide and any excess of the metal hydroxide is washed out, and the wash water is allowed to drain off of the resin product which then is dried.

Generally considered, the halohydrin is a polyfunctional derivative of an aliphatic polyhydric alcohol, advantageously a lower polyhydric alcohol, such as one containing three to six carbon atoms. Since this halohydrin contributes the alcoholic hydroxyl group to the resin product of the invention, it can be referred to as the polyfunctional hydroxyl-providing reactant. Advantageously it can be a halohydrin derived from glycerol such as an epihalohydrin as epichlorhydrin or epibromhydrin, or an epihalohydrin of a higher alkyl polyol as a hexitol, for example, the epichlorhydrin or epibromhydrin of mannitol, or of sorbitol, and the like.

In the appended claims, the expression "1,2-vicinal-epihalohydrin" means an epihalohydrin wherein its halogen is linked to the 1-carbon which latter is linked to a carbon of the epoxy group.

The methylene bis(5-substituted hydantoin), is one wherein one or both hydrogens on the 5-position carbon in both of the hydantoin rings is replaced by a substituent that is inert to reaction with formaldehyde, and with the polyfunctional hydroxyl-providing reactant, and also with the alkaline metal hydroxide used. One skilled in this art, thus, readily can recognize what substituents are applicable on the 5-carbon in each hydantoin ring. Such substituent can be the same or different if both hydrogens on such 5-carbon are replaced; and each can be, for example, straight or branched chain or cyclic aliphatic such as alkyl as methyl, ethyl, n-propyl, isopropyl, n-butyl, isobutyl, tert.-butyl, n-amyl, isoamyl, or tert.-amyl, hexyl, or cyclo-alkyl as cycloamyl or cyclohexyl, or keto-cycloalkyl as keto-cyclohexyl, or alkyloxy such as methoxy, ethoxy, isopropoxy, and the like.

Such substituent quite effectively is lower aliphatic, with, say, a total of about seven carbon atoms. Advantageously, the alkyl radical may have at most five carbon atoms. Accordingly, applicable such 5-mono-substituted, or 5,5-disubstituted, hydantoins are illustrated by, but not restricted to, those disclosed and exemplified in U.S. Patent No. 2,155,863, as well as by those which by reaction with formaldehyde yielded the N,N'-methylene (5-substituted) hydantoins disclosed in, and shown by the examples of, U.S. Patent No. 2,417,999. Alternatively, the hydantoin can be disubstituted at its 5-carbon by having each original hydrogen replaced by one end of a divalent lower alkylene chain such as the divalent trimethylene or tetramethylene radicals. The 5-carbon thereby forms with such divalent radical a single cyclo-aliphatic group or ring which is fused (as distinguished from being linked) to the heterocyclic hydantoin ring, for example, to give a 5,5-lower alkylene spiro hydantoin such as in 5,5-tetramethylene spiro hydantoin or 5,5-pentamethylene spiro hydantoin.

While the resins of the invention can be prepared by using any of the hereinabove described polyfunctional hydroxyl-providing reactants, the various features of their preparation conveniently can be described by more specific reference to an epihalohydrin as such agent. Thus, it is understood that reference to it in the following general description is merely for convenience and that such description then is not to be considered as confined to use of an epihalohydrin except where that appears to be the specific intent.

The resins of the invention can be prepared by using one mole of the epihalohydrin per mole of the N,N'-methylene bis(5-substituted hydantoin). However, as already stated, it is advantageous to use a somewhat higher molar proportion of the epihalohydrin, for example, up to about two moles per mole of the methylene bis hydantoin, and generally yet get a solid resin. Ordinarily, the higher the epihalohydrin ratio, the softer the uncured resin. Usually the highest yields are obtained when using from about 1.1 to about 1.6 moles of the epihalohydrin per mole of the methylene bis hydantoin.

By using at least about ten percent excess over two moles of epihalohydrin per mole of the methylene bis hydantoin, generally there results nearly liquid uncured resins of low epoxide equivalent weight.

The reaction between the two essential reactants, i.e. the epihalohydrin and the methylene bis hydantoin, is carried out in an aqueous solution generally of a water-soluble alkaline hydroxide in an amount sufficient to neutralize the hydrogen chloride produced in (the condensation of) the reaction. Ordinarily, it is most convenient to use either of the two more commonly available alkali metal hydroxides, sodium or potassium hydroxide.

The mechanism of the condensation appears to be that such alkali forms the corresponding sodium or potassium salt of the hydantoin by replacing the hydrogen linked to its imido nitrogen; and then such alkali metal salt reacts with the epihalohydrin to form the water-insoluble resinous condensation product, with accompanying formation of the corresponding sodium or potassium halide which dissolves in the aqueous reaction medium.

While any other alkali metal hydroxide can be used, there also can be used as the alkaline or neutralizing agent an aqueous dispersion of an alkaline earth metal hydroxide, for example, calcium, barium, or strontium hydroxide, including magnesium hydroxide among them as commonly is done. There also can be used an hydroxide, inert to the epoxy group of the epihalohydrin, of a metal which can form under those aqueous reaction conditions the corresponding metal salt of the methylene bis hydantoin, and whose resulting halide is water-soluble so as to dissolve in water while the reaction proceeds. The water-soluble alkali metal silicates such as sodium orthosilicate and sodium metasilicate, also can be used, although they may extend the reaction time and may give lower yields.

As already indicated the amount of the alkaline or neutralizing agent should be sufficient to neutralize the hydrogen chloride to be withdrawn during the condensation. However, use of a slight excess of that agent is preferred when it is water-soluble. An excess of it when it is not completely water-soluble best is avoided because of the difficulty that may occur in separating it from the precipitated resin reaction product.

The neutralizing agent, whether soluble or otherwise dispersible in water, can be used in any practical concentration indicated by the relative quantities used of the two essential reactants. A reasonable guide is given by the experience had, for example, with water solutions of sodium hydroxide and of potassium hydroxide. Their concentrations can be varied from about three to about sixteen and one-half percent. However, with an epihalohydrin and N,N'-methylene bis(5,5-dimethyl hydantoin), a solution of from about five to about six percent gave reasonably high yields with sodium hydroxide.

High yields with potassium hydroxide were obtained with solutions of it from about ten to about fifteen percent, and possibly even at sixteen percent. At over sixteen and one-half percent, there did not appear to be any noticeable drop in yield, but more time appeared to be needed to rinse out the potassium halide formed and any excess potassium hydroxide.

The reaction may be postulated as occurring as follows:

wherein one of R and $R_1$ can be hydrogen, and the other of them, or both of them, can be any of the substituents disclosed above (from page 3 line 3 through page 4 line 1), although the polyalkylene spiro group cannot be present when one of R and $R_1$ is hydrogen; and $n$ can vary from zero through nine or ten, and advantageously can be an average of about three; or may even be as high as about fifteen.

The reaction can be carried out at from ambient temperature to about 100° C. As the reaction is exothermic, its own released heat contributes to keeping the reaction going. It is not uncommon that the released heat raises the reaction mixture temperature about 20° C. or more during the course of the reaction.

For a reasonably practical reaction rate, it is helpful initially to heat the reaction mixture at least to about 25° C., and advantageous to operate in the range between about 50° to about 60° C. That range appears to give desirably good yields when using sodium hydroxide. With potassium hydroxide optimum yields result between about 50° to about 54° C. Below 50° C. the reaction rate slows down appreciably.

Within the indicated temperature ranges for high yields, the time for the reaction to be completed often varies from about twelve to about twenty-five minutes, and when the molar ratio of the epihalohydrin to the methylene bis hydantoin is ordinarily under two to one. However, where that ratio is about two, or more, to one, the reaction time may be considerably longer and at the higher ratios even up to about an hour.

The products of the invention and the method of their preparation are illustrated by, but not restricted to, the following examples including several wherein epichlorhydrin and N,N'-methylene bis(5,5-dimethyl hydantoin) are used in the ratio respectively given at the beginning of each such example:

Example 1.—Ratio 1.8 to 1

Forty grams (1.0 mole) of sodium hydroxide were dissolved in 725 milliliters of water in a resin flask (to give a 5.23 percent solution of sodium hydroxide). While stirring this solution, 134 grams (0.5 mole) of methylene bis(5,5-dimethyl hydantoin) were added, and the stirring was continued until all of it dissolved (about 20 minutes).

This latter solution was heated to 50° C. and vigorously stirred while 83.27 grams (0.9 mole) of epichlorhydrin were added. The heating then was discontinued and the stirring continued until a white sticky resinous substance settled out (about 22 minutes). After letting the reaction mixture stand for a few minutes, the supernatant liquid (containing the NaCl produced in the reaction and the excess NaOH) was decanted off. The remaining resinous reaction product was washed with hot water until the washings were neutral to phenolphthalein. After letting the water drain off of the reaction product, it then was dried for one hour at 120° C., and a half hour at 130–135° C.

This dried resin has an estimated molecular weight of about 1340, and epoxy equivalent weight of 762.

Example 2.—Ratio 1.6 to 1

The steps of Example 1 were repeated with the only

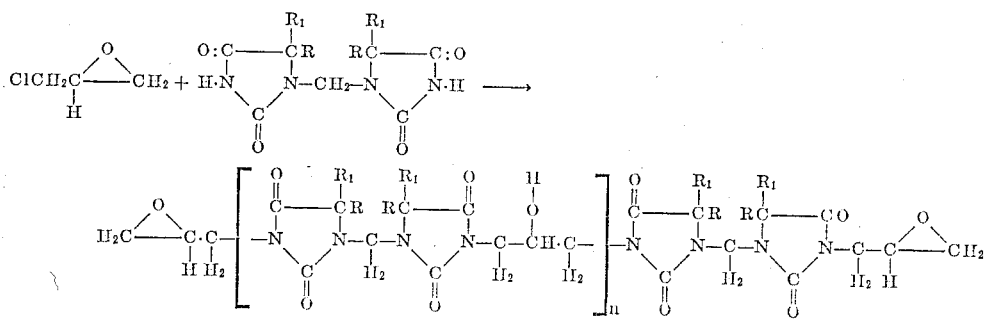

changes being that 36 grams (0.9 mole) of sodium hydroxide were dissolved in 655 milliliters of water (to give a 5.21% solution of NaOH), and 74 grams (0.8 mole) epichlorhydrin were used. The dried resin end product has an estimated molecular weight of 1341, and epoxy equivalent weight of 838.

Example 3.—Ratio 1.3 to 1

Example 1 was repeated with the only changes being that 29 grams (0.725 mole) of sodium hydroxide were dissolved in 510 milliliters of water (to give a 5.56% solution of NaOH), and 51.12 grams (0.65 mole) of epichlorhydrin were used. The dried resin end product has an estimated molecular weight of 1530, and epoxy equivalent weight of 1179.

Example 4.—Ratio 2 to 1

Example 1 was repeated with the following changes: 45 grams (1.12 moles) of sodium hydroxide dissolved in 910 milliliters of water (a 4.7% solution of NaOH); 92.5 grams (1 mole) of epichlorhydrin were used. The dried resin reaction product has an estimated molecular weight of 1347, and an epoxy equivalent weight of 674.

Example 5.—Ratio 2.2 to 1

Example 1 was repeated with the exception that 49 grams (1.225 moles) of sodium hydroxide were dissolved in 890 milliliters of water (a 5.22% solution of NaOH); 101.8 grams (1.1 moles) of epichlorhydrin were used, and the reaction started at 25° C. and ran for 60 minutes (because of lower reaction rate). The dried resin reaction product's estimated molecular weight is 1183, and epoxy equivalent weight is 538.

The methylene bis(5,5-dimethyl hydantoin) of any of these Examples 1 through 5, and in any others herein, can be replaced by an equivalent amount of any other hereinabove disclosed to be applicable methylene bis(5-monosubstituted hydantoin) or methylene bis(5,5-disubstituted hydantoin) and within the same general range of ratios to the selected halohydrin employed as indicated herein. Such substitution is illustrated by, but not restricted to, the following examples:

Example 6.—Ratio 1.6 to 1

Twenty-one grams (0.525 mole) of sodium hydroxide were dissolved in 361 milliliters of water (a 5.43 percent solution) in a resin flask. While stirring this solution, 81 grams (0.274 mole) of N,N'-methylene bis(5-methyl, 5-ethyl hydantoin) were added and the process continued as in Example 1, except for the use of 40.5 grams (0.438 mole) of epichlorhydrin.

The dried resin end product has an estimated molecular weight of approximately 730, and an epoxide equivalent of approximately 456.

In any of the preceding examples, the sodium hydroxide can be replaced by a generally equivalent amount of any other of the herein stated to be applicable alkaline agents having a cation that forms a water-soluble halide salt, e.g. chloride or bromide, with a hydrohalide such as hydrochloric or hydrobromic acid. The sodium hydroxide can be replaced advantageously by potassium hydroxide. The latter generally provides a softer end product resin than does sodium hydroxide. Such substitution is illustrated by, but not restricted to, the following examples using an aqueous solution of KOH in the respectively indicated percentages:

Example 7.—Ratio 1.6 to 1

49.5 grams (0.84 mole) of KOH were dissolved in 655 milliliters of water to give a 7.03% solution of KOH. The latter was stirred while adding 134.1 grams (0.5 mole) of methylene bis(5,5-dimethyl hydantoin), and the stirring continued till it dissolved completely. The temperature of the resulting solution was raised to 50° C.; and 74 grams (0.8 mole) of epichlorhydrin were added under vigorous stirring. The reaction continued at the elevated temperature without further heating. The stirring was stopped after about twenty minutes; and a white resinous mass settled out. It was washed with hot water until the washings were neutral to phenolphthalein, and then dried at 120° C. for an hour. Its estimated molecular weight is about 980, and epoxide equivalent averages 545.

The steps of Example 7 were repeated with the only change being that 100.8 grams of fifty percent aqueous potassium hydroxide solution were diluted with 300 milliliters of water, thereby using a 12.55% solution of KOH. Similarly, this last described procedure was repeated with the only change being use of 233 milliliters of water instead of 300, thereby using a 15.1% solution of KOH. Then also, this very last example was repeated by taking only 216.5 milliliters of water instead of 233, thereby using a 16% solution of KOH.

Each of the separate examples described hereinabove can be repeated by replacing the NaOH or KOH in part or entirely by the equivalent alkalizing amount of any other herein stated to be applicable alkalizing agent, such as another alkali metal hydroxide or alkaline earth hydroxide or at least in part by a water-soluble alkali metal orthosilicate or metasilicate such as sodium or potassium orthosilicate or metasilicate.

Each such modified example obtained by thus replacing the alkaline or neutralizing agent by any of those stated herein to be applicable, and/or by replacing the specific methylene bis(5-substituted or 5,5-disubstituted hydantoin) by any other having the constitution disclosed above (p. 3 line 1 through p. 4 line 1), and/or by replacing the epichlorhydrin by another epihalohydrin or any polyfunctional hydroxyl-providing agent such as described at page 2 lines 16–26, is considered as respectively separately set out in full detail herein by the foregoing reference to it. Thereby extending this specification unnecessarily and making it unduly prolix are avoided by the just given general description of such series of these various specific examples in place of a long drawn out repetition of the same steps with mere changes in identity and readily notable respective specific quantities of chemicals used.

In each of these various examples (i.e. Examples 1–7 as well as those thus included by reference, as provided in the just preceding paragraph), use of KOH as the alkaline agent provided more rapid dissolution of the specific methylene bis(substituted hydantoin) used. Apparently, the potassium salt of such hydantoin is more soluble in water than the corresponding sodium salt.

In any of the examples, the particular methylene bis(substituted hydantoin) can be dissolved more rapidly in the aqueous solution of the particular alkaline agent used, if the aqueous solution of the latter initially is pre-heated to 60° C. or higher before adding the hydantoin; and then after it is added, cooling the thus obtained reaction solution to the particular reaction temperature selected for initiating the reaction between the hydantoin and the polyfunctional hydroxyl-providing agent.

In any of the examples wherein a more highly concentrated aqueous solution of the alkalizing agent is used, for example, when using about 10% or more of the NaOH or 12 or more percent of KOH, it is beneficial to use a reaction initiating temperature somewhat higher than the ambient temperature to enhance dissolution of the methylene bis(substituted hydantoin).

The epoxy equivalent, and the extent of condensation, apparently are increased by raising the reaction mixture temperature, advantageously after the exothermic part of the reaction, to a level below that at which splitting, or breaking of the chain, occurs. The effect of such change in temperature is illustrated by, but not restricted to, the following example:

Example 8.—Ratio 1.6 to 1

151.2 grams of 50% aqueous KOH were diluted with 358.5 milliliters of water (making a 15% aqueous solution of KOH). While stirring this solution, 201.1 grams (0.75 mole) of methylene bis(5,5-dimethyl hydantoin) were added, and the stirring continued until it all dissolved. The resulting solution was heated to 50° C. and stirred actively while 111 grams (1.20 moles) of epichlorhydrin were added.

The exothermic reaction increased the temperature of the solution until it reached 96° C. While the sticky resinous substance was forming, heat then was applied and the temperature raised to 103° C. and maintained there for 15 minutes. After letting the white opaque sticky resin settle for a few minutes, the supernatant aqueous solution (of KCl produced in the reaction and excess KOH) was decanted off and the product washed, drained and dried as in the preceding examples. The dried resin has an epoxy equivalent weight of 1300.

Certain advantages such as in improved yield, lower quantity of epihalohydrin needed, and enhanced washing of the end product resin, result from modifying the method in certain respects, for example, introducing separate portions of the alkali metal hydroxide, particularly potassium hydroxide, in two separate steps, by using in the first step from about 25% to at most half of the total amount of alkaline hydroxide needed; and also including, say, about 10% or so of a water-soluble or miscible inert solvent, such as a lower alkyl ketone as acetone, in the aqueous reaction medium. Such modifications are illustrated by, but not restricted to, the following example:

Example 9.—Ratio 1.25 to 1

2.4 grams of sodium orthosilicate are dissolved in 1289 milliliters (i.e. mls.) of water in a jacketed resin kettle equipped with a stirrer, reflux condenser, and dropping funnel, and with separately operated steam and cooling water connections to the jacket of the kettle, with corresponding outlets. With stirring, there are added 144.4 mls. of acetone and 134.6 grams of a 50% aqueous solution of (technical grade) potassium hydroxide (1.2 moles).

With the stirring continuing, 643.7 (2.4 moles) of N,N′-methylene bis(5,5-dimethyl hydantoin) are added. Steam is introduced into the jacket until the reaction mixture reaches 80° C. The steam then is replaced by flowing cooling water to reduce the temperature to about 60° C. when there is added with vigorous stirring 277.5 grams (3 moles) of epichlorhydrin, and the water flow reduced and adjusted to maintain the reaction medium at between 53° and 56° C. for 25 minutes with continued stirring.

Steam then replaces the water until the reaction mixture is heated to about 65° C. when the steam is turned off. The 210.36 grams balance of the 50% aqueous solution of potassium hydroxide (1.875 moles) then is added in increments of one-tenth of its volume, about every 45 seconds to one minute with due care that the potassium hydroxide is not added too rapidly because of the exothermic nature of this step of the reaction. After all of the potassium hydroxide is added, the reaction mixture is heated to reflux at 83 to 84° C. for 30 minutes with vigorous stirring.

The reaction mixture then was cooled to a safe handling temperature, 45° C., and its upper layer quickly decanted and discarded. The lower layer composed of the resin, while still fluid, was poured into a receiver, and washed twice with cold water, and then with warm (60°–65° C.) water until no longer alkaline to phenolphthalein, and salt-free to 10% silver nitrate solution. The resinous mass then was dried at 165° C. until no further bubble release was noted. The dried resin was obtained in a yield of 86% of theoretical and with epoxide equivalency of 1037.

The total amount of potassium hydroxide used is an excess of 2.5% over the amount required for the reaction. The excess can be increased to 4 or 5% of that required amount with resulting higher molecular weight of the obtained resin. Then an increase in the temperature of the water used for washing it should be made.

The respective procedures of Examples 8 and 9 can be repeated separately by replacing their epichlorhydrin by any other applicable 1,2-vicinal epihalohydrin described hereinabove. In any of these examples and their just noted separate modifications, the specific methylene bis hydantoin can be replaced by any other described herein as applicable. So also in any of them and of their just described modifications, the potassium hydroxide can be replaced by any other herein described applicable alkalizing agent.

Each such modified example obtained by the thus described respective replacements is to be considered as respectively separately set out in full detail herein by the foregoing reference to these specific replacements to avoid unnecessarily extending the specification and making it unduly prolix.

The reaction product resin as obtained in the various examples appears of a generally whitish opaque pasty to putty-like nature. After separating it from the reaction solution and washing out the salt and excess alkali, and drying the resin, it becomes glassy, transparent, hard and brittle and is generally colorless so long as good water is used in preparing it.

Each of these resin products of epichlorhydrin and methylene bis(5,5-dimethyl hydantoin) is soluble separately in methyl ethyl ketone, diacetone alcohol, ethylene glycol monobutyl ether (i.e. butoxy ethanol), ethoxy ethanol, methoxy ethanol, the acetate of each of these alkoxy ethanols, and compatible mixtures of any of them, in dimethylformamide, and in 1,4-dioxane; and also in aqueous solutions, e.g. about equal volumes of water and, of some water-soluble oxygen-containing solvents such as aqueous 1,4-dioxane (e.g. about 50–50), aqueous isopropanol, aqueous tertiary-butyl alcohol, and aqueous acetone.

While they show no significant solubility in the aromatic solvents toluene, and xylene, they do dissolve in mixtures of any of them with some water-soluble oxygen-containing solvents. For example, they dissolve in mixtures of xylene with the various lower alkoxy ethanols and with their acetates, and mixtures of any of them. They also show some solubility in xylene mixed with methyl isobutyl ketone. They also dissolve in mixtures of methyl isobutyl ketone with the various alkoxy ethanols and their acetates and mixtures of any of them.

Generally, all other conditions being alike, the end product resin has a lower epoxy equivalent weight when potassium hydroxide is used as the alkaline agent than when sodium hydroxide is so used.

The general method of preparing the resin reaction products of the invention usually gives good yields. Particularly with the higher concentrations of the alkaline agent, e.g. the aqueous solutions of sodium or potassium hydroxide and the like, yields are at least about 75% and may be as high as 90%.

The various resins resulting from the invention can be cured with various curing agents. Thus, they provide cured resins which are hard, highly flexible and ductile, and manifest advantageous chemical resistance.

Applicable curing agents include those polyamide resins known generally as 'Versamids' (products of General Mills, Inc., of Minneapolis, Minn.). They are thermoplastic condensation products of polymeric fatty acids with polyamides. Such 'Versamids' are used in preparing the thermosetting resinous compositions described in U.S. Patent 2,705,223. Other applicable curing agents are any of the polyamines which have both primary and secondary amine groups. In some cases, it may be possible to use the titanium ester material and a lactam or mixtures of lactams, such as U.S. Patent 2,847,341 discloses.

The resin products of the invention and the cured resins thereof, as well as their esters with fatty acids, for example, of vegetal (i.e. animal and vegetable) origin, such as the fatty acids of linseed oil and of soyabean oil or other of vegetal origin, are useful as the fundamental coating constituent in the preparation of coating compositions, and even of the aqueous dispersion type prepared with some of them. The esters of those fatty acids having at least high unsaturated acid content can be self-drying. Those prepared from primarily saturated fatty acids, such as coconut fatty acids or those of animal origin, can be reacted further with melamine type resins to form corresponding baking resins. They also are useful as an important ingredient for inclusion with other constituents used in preparing other coating solutions. With a suitable colorless curing agent, the resulting cured resin also will be colorless. Such colorless cured resin thus is worthwhile as an advantageous constituent for use in clear lacquer coating formulations.

Coating formulations with a reaction product resin of the invention and a curing agent are illustrated by, but not restricted to, the following:

Example 10

Eighty grams of a reaction product resin of the invention (epoxy equivalent weight about 800) prepared from epichlorhydrin and methylene bis(5,5-dimethyl hydantoin), in the molar ratio of 1.6 to 1, using a 10% aqueous solution of KOH as in Example 8, was stirred and heated under a reflux condenser to solution in 84 grams of equal parts of water and 91% isopropanol alcohol.

To that solution there was added 13.4 grams of ethylene glycol monoethyl ether (to slow down evaporation of the isopropanol solvent during the subsequent coating). Into this solution there was stirred 2.5 grams of triethylenetetramine (as curing agent) to give a good free flowing coating solution.

This coating solution was applied over buffed steel and over anodized, as well as conversion coated, aluminum sheets. After curing the thus coated sheets at 265° F. for 10 minutes, the resulting finished coating was transparent, hard, completely adherent, highly ductile and flexible (without cracking or breaking away after bending the sheets) and showed high chemical resistance, e.g. inert to boiling aqueous caustic alkali.

The preparation of esters of the resin end products of the invention is illustrated by, but not restricted to, the following examples:

Example 11

Soyabean oil fatty acids ester: 242.2 grams of soyabean mixed fatty acids and 0.26 gram of sodium benzoate (as catalyst) were heated to 150° C. under a nitrogen blanket in the closed kettle of standard laboratory resin equipment with a Barrett distilling receiver for water collection. 250 grams of the resin of Example 9, crushed into small pieces, were added to the contents of the kettle at a slow but uniform rate. As soon as the reaction mass was sufficiently mobile, slow stirring was started. 35 mls. of xylene then were added (to serve as water-entrainer) and the temperature was raised rapidly to 240° to 250° C., and soon thereafter the stirring was increased to a vigorous rate. The temperature was increased to 260° C. and maintained there throughout the run with periodic determinations of the acid number.

When the acid number fell to 6 to 6.5, there were added 28.6 grams of Empol 1016 dimer acid (described below) together with 10 mls. of xylene. Heating of the reaction mixture was continued while maintaining it at 260° C. until 11 hours of esterification time had passed when the temperature was raised to and held at 265° C. for another hour when the acid number was 3.5. The reaction mixture then was cooled to 150° C. and 400 mls. of xylene were added to reduce the solid content of the ester solution to 60%. The viscosity of the resulting solution was V on the Gardner-Holdt scale and its color was 2-3 on the Gardner 1963 scale.

To a test portion of that 60% solids ester solution further diluted to 45 to 50% total solids, was added 0.0015% Co and 0.015 Pb driers (as their respective naphthenates) and the solution was brushed over cold rolled steel test panels. The resulting films were set-to-touch within from about 10 to about 20 minutes and also were tack-free within 1 to 2 hours. After remaining untouched for 7 days, their Sward hardness was 60+. At the end of 8 days, they passed the flexibility test in being bent fully over the one-eighth inch mandril.

The Empol 1016 dimer acid is a liquid product composed primarily of 87% of a $C_{36}$ aliphatic dibasic acid with varying amounts, e.g. 13%, of $C_{54}$ tribasic acid, and formed through the polymerization of unsaturated fatty acids at the mid-molecule, with only a trace of monobasic acid and dimer-trimer molar ratio of 7:1; and color of 7 maximum on the Gardner 1963 scale.

The process of Example 11 was repeated except for using 290.6 grams of the soyabean acids, 300 grams of the resin of Example 9 and 34.4 grams of the dimer acid, but without any catalyst; and after cooling the finished esterification solution to 150° C., when its acid value was 3.75, diluting it with xylene to a concentration of 55% solids. Its viscosity was V-W and color 4-5. The properties of its films on cold rolled steel were identical with those from the ester solution of Example 11.

Example 11 was repeated with the same quantities of reactants as in the immediately preceding paragraph but using 0.47 gram of lithium ricinoleate as catalyst, which required a total esterification time of eight and one-half hours. On dilution with xylene to 60% total solids, its acid value was 2.8, viscosity W-X, and color 4-5. The properties of its films on the panels were identical with those from the solution of Example 11.

Use of a catalytically effective amount of esterification promoter such as a zinc salt of an organic acid as zinc resinate, zinc naphthenate, zinc octanoate, zinc tallate, and the like in place of, for example, the sodium benzoate catalyst, is advantageous. That is so because using such zinc salt esterification promoter not only (i) reduces the esterification mixture viscosity and enables more readily attaining quite a low acid number, for example, 2.5 or lower, but also (ii) indicates other improvement in the resulting film such as better resistance to the 10% sodium hydroxide solution. Use of such zinc salt esterification promoter also eliminates the need to include a top drier, for example, a cobalt top drier such as cobalt naphthenate, or a manganese-containing or other top drier, the elimination of which, such as the 0.0015% Co from Example 11 and formulations based on it, allows the similarly resulting films therefrom to be set-to-touch also within from 10 minutes to about a half hour.

Zinc tallate is the zinc salt of the recovered mixed fatty acids of tall oil. These acids (i) are composed for the most part of the unsaturated acids such as oleic, linoleic and linolenic acid, and smaller amounts of stearic acid and other saturated fatty acids, and a small amount of some rosin acids, and (ii) are exemplified by the product available under the trademark Acintol EPG (of Arizona Chemical Company), the typical composition of which contains 99.3% of fatty acids as follows:

| | Percent |
|---|---|
| Linoleic (non-conjugated) | 38.5 |
| Linoleic (conjugated) | 5.0 |
| Oleic | 51.2 |
| Stearic | 2.7 |
| Other fatty acids | 2.6 |
| Rosin acids | 0.3 |
| Unsaponifiables | 0.4 |

Any of the above-referred to esterification promoters, which is a zinc salt of an organic acid is briefly called a "zinc salt esterification promoter." Such zinc salt esterication promoter can be used generally within the range of from about 0.04 to about 0.16 percent (on its combined zinc basis) of the total solids used in preparing the ester.

This modification of the ester portion of the invention is illustrated by, but not restricted to, the following examples:

Example 12

Ester of epoxy resin and soya acids, with zinc naphthenate: 245.7 grams of soyabean oil fatty acids were heated to 170° C. under a nitrogen blanket in an apparatus like, and by handling much like that used in, Example 11. Then to them was added 2.7 grams of zinc naphthenate (containing 8% Zn) and 35 ml. of xylol. 270 grams of an epoxy resin (prepared as in Example 9 but with a ratio of 1.225 moles of epichlorhydrin to one mole of the methylene bis hydantoin and using between 1 and 2% excess KOH) then were added as in Example 11. The heating was continued and slow stirring started when the reaction mixture was fluid as it reached 180° C., and as continued heating raised the temperature further, stirring was increased to be vigorous, and the esterification was conducted at 260° C. with periodic acid number determinations, all as in Example 11.

When the acid number fell to 3.4 (at about 3 hours and 40 minutes esterification time), there was added 24.3 grams of 'Empol 1016' dimer acid (previously warmed to reduce its viscosity) and the temperature was increased over the next 2 hours to 265–267° C. Then after a total esterification time of 7 hours and 8 minutes with the temperature between 267–268° C., the acid number was 2.36. The esterification was continued for another 15 minutes at 268° C. when it was discontinued, and the acid number was 2.0. The reaction mixture was cooled to 150° C. and xylene added to reduce to 60% the solid content of the final ester solution.

Example 13

Ester of epoxy resin and soya acids, with zinc resinate: The procedure of Example 12 was repeated using 244.8 grams of the soyabean oil fatty acids, 2.78 grams of zinc resinate (containing 7.4% of combined zinc) and 250 grams of the same resin were added. The zinc resinate thus amounted to 0.54% of the total solids and was equivalent to zinc being 0.04% of the total solids. After 3 hours and 15 minutes at 260° C. the acid number was 3.78. After 4 hours and 12 minutes of esterification time still at 260° C., 20.6 grams of the 'Empol 1016' acid were added and the esterification continued at 262° C. to an overall esterification time of 8 hours and 10 minutes when the acid number was 2.8. After cooling to 140° C., xylene was then added in an amount to have the resulting solution contain 50% of solids.

So far as presently indicated and at least with the soyabean oil fatty acids, it is advantageous to use in the esterification about equal parts (i) of the epoxy resin and (ii) of the total of the selected esterifying acid or acids reactant.

Air-dried films resulting from brushing these ester solutions containing 50% solids, obtained by the use of such zinc salt esterification promoter as zinc resinate, over test panels were set-to-touch within about 10 to 20 minutes, showed high gloss and also high resistance in the 10% sodium hydroxide solution test. After remaining untouched for 6 or 7 days they showed a Sward hardness of at least about 60 and even as much as 70. At the end of 8 days these films passed the flexibility test over the one-eighth inch mandril.

Other ester derivatives of the epoxy resins of the invention such as those with the linseed oil acids, castor oil acids, mixed fatty acids of tall oil, tung oil, and others, or with compatible mixtures of any of them and also with the soyabean oil fatty acids, can be made by essentially the same method as that of some one or more of Examples 11 to 13, for use in preparing relatively similar coatings as well as others with varied properties. With the mixed fatty acids of tall oil, present indications are that it is better to use the procedure of Example 12 or preferably of Example 13.

The ester resulting from using the mixed fatty acids from tall oil as the sole esterifying acids in some cases may not be suitable for some coating applications. Solutions of some such resulting tall oil ester in an aromatic solvent as xylol may be suitable in some non finish coating use such as a binder for molding sands.

Instead of esterifying the epoxy resin of this invention solely with the mixed fatty acids recovered from tall oil, the latter acids can be admixed with others to reduce the overall cost. For example, instead of using entirely linseed oil fatty acids, they can be replaced in part to the extent of, say 30 to 40% by the mixed fatty acids from tall oil. Similarly, the soyabean oil fatty acids can be replaced in part, approximately up to about 30%, by mixed fatty acids from tall oil.

Preparation of esters with the epoxy resins of the invention is not restricted to those produced solely with mixtures of acids such as just above-mentioned. Esters of those resins also can be prepared with single acids such as individual members of those mixtures, for example, linoleic acid, oleic acid, stearic acid, or from myristic, palmitic or lauric acid, or pelargonic acid, and others, or mixtures of some of them. Isostearic acid (a liquid isomer of stearic acid and so far indicated to be a complex mixture of mutually soluble and virtually inseparable isomers of it, primarily of the methyl-branched series, and which combines the saturation and stability against oxidation of stearic acid with the liquid nature and solubility characteristics of oleic acid) also can be used to provide esters of varied applications.

In addition to those mentioned earlier above (page 16 lines 9–22), there also can be used as curing agents with the polymeric substances of the invention tertiary amines of the so-called catalytic type of hardeners for resins, as well as other catalytic type hardeners. The curing agents disclosed in U.S. Patent 2,837,497 also can be used.

Still further curing agents useful with the resin substances of the invention are suitably effective quantities, depending on the contemplated use, of the various urea-formaldehyde resins, including their lower alkyl derivatives such as the butylated urea-formaldehyde resins, also of the dimethylolurea resins, the melamine-formaldehyde resins, and phenol-formaldehyde resins, and also of suitable mixtures of these resins, and also suitable quantities of the liquid polysulfide polymers having the general formula $$HS \cdot C_2H_4-O-CH_2-O-C_2H_4-(S-S$$
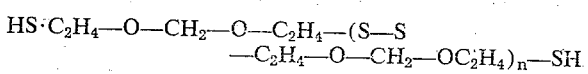
$$-C_2H_4-O-CH_2-OC_2H_4)_n-SH$$

with cross-linking occurring at the —S—S— positions.

Still other curing agents usable with the polymers of the invention, and advantageously in water-miscible solvents such as the ketone, ester, and ether (e.g. dioxane) types, are the applicable anhydrides of organic polybasic acids which form anhydrides, for example, lower aliphatic acids, saturated and unsaturated, as oxalic, maleic, succinic, n-propenylsuccinic, dodecenylsuccinic, fumaric, glutaric, adipic, sebacic and azelaic acids, hydroxy lower aliphatic acids as tartaric, malic and citric acids, and also aromatic acids such as phthallic, tetrahydrophthallic, trimellitic, pyromellitic, and also methyl nadic and chlorendic acids. Often these various foregoing anhydrides, or di-anhydrides (as of pyromellitic acid) are considered as catalytic type curing agents. Here, however, they also act as the reactive type for, used in adequate amounts, they form half esters with hydroxyl groups of the polymeric substances of the invention.

The dispersibility of the substances of the invention in water-miscible solvents is a decided advantage not only in the lower cost stemming from the possibility of using suitable proportions of water in formulations, but also from the increased safety because of the lower flash points and lower toxicity of water-miscible solvents and solutions of them in water.

The expression "fatty acids of vegetal origin," as used earlier above to exemplify the fatty acids applicable in preparing the esters of the invention, does not restrict the applicable fatty acids merely to those from a vegetable or animal source. Thus, the expression "a fatty acid of vegetal origin" is used herein and in the appended claims in the broad sense of identifying any of these various individual fatty acids which are suitable for making the esters regardless of the specific source from which any one or more of the applicable acids is or are obtained. Hence, the expression concerned embraces any of those fatty acids whether of vegetable or animal or even synthetic source.

While xylene is the individual water-entrainer used in Example 11, any other hydrocarbon water-entrainer can be used because of its being immiscible with water so as to separate from it after their joint condensation and enable returning it to the reaction mixture for further water-entraining, such as another mononuclear aromatic solvent as benzene or toluene, and any of the likewise suitable aliphatic water-immiscible hydrocarbon solvents, or mixtures of them. However, as shown by Examples 11–13, it is beneficial to use as such hydrocarbon water-entrainer one in which the resulting ester is soluble.

Because the various fatty acids applicable in preparing the ester derivatives of the epoxy resin of the invention differ in constitution, for example, in being saturated or unsaturated and of the latter being mono- or di- or even tri-olefinic, and with either of the two poly-olefinics being conjugated or non-conjugated, and also due to the various uses which can be made of the finished esters, the practical completion of the esterification ordinarily cannot be noted as being the attainment of a specific low acid number.

For example, useful coating films were obtained from the different formulations of Example 11 with their respective final acid numbers of 3.8, 3.75, and 2.8. Other somewhat improved coating films were obtained from the variations followed in Examples 12 and 13 with their esters having resulting acid numbers of 2.78 and 2.8 respectively. Esters having acid numbers not quite that low may be applicable in preparing adhesive films.

Accordingly, because of such differences in (i) constitution of the fatty acid or mixture of fatty acids used and (ii) the ultimate use to be made of the final ester, the conclusion of the esterification cannot be delineated by an approximate numerical limitation. Thus, its conclusion is compelled to be described as by referring to carrying on the esterification "until the acid number of the esterification mixture is low enough to indicate a practical completion of the esterification."

One having ordinary skill in the pertinent art then can determine the practical completion for the particular type of ester desired, by withdrawing samples at various intervals from the esterification mixture, determining the respective acid number from them and running a few simple property tests to note whether the esterification has run long enough for the resulting ester to manifest that it possesses the sought for properties. Then he can use the indicated completion operating conditions for the further runs.

While the various aspects of the invention have been illustrated by detailed descriptions of certain specific embodiments of each of them, it is understood that various modifications and/or substitutions may be made in any of them within the scope of the appended claims which are intended also to cover equivalents of the various embodiments.

What is claimed is:

1. A polymeric substance having the general formula

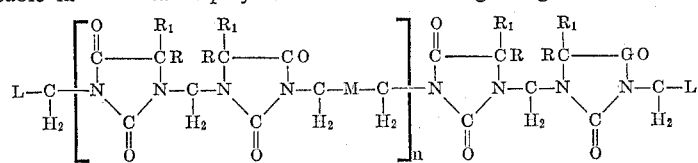

wherein R is a member of the class consisting of hydrogen and a monovalent substituent inert to alkali, to reaction with formaldehyde, and to reaction with a 1,2-vicinal-epihalohydrin of an aliphatic polyol having from 3 to 6 carbons; $R_1$ is a monovalent substituent inert to alkali, to reaction with formaldehyde and to reaction with a said epihalohydrin; and when none of R and $R_1$ is separately substituted, R and $R_1$ jointly are a divalent lower alkylene radical having from one to seven carbon atoms; and M is a divalent radical having from one to four carbon atoms and a member of the class consisting of (i)

and (ii) the divalent group

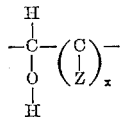

wherein Z is a member of the class consisting of hydrogen and the hydroxyl group, and $x$ is a whole number from 1 to 3, and when $x$ is greater than one, Z can be different in each group

and L is a monovalent group which is a member of the class consisting of (a)

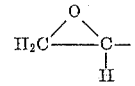

and (b)

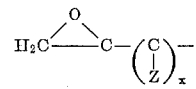

wherein $x$ and Z are defined respectively as hereinabove; and $n$ varies from zero to about 15.

2. A polymeric substance as claimed in claim 1, wherein M is

and L is

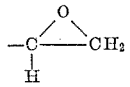

3. A polymeric substance as claimed in claim 2, wherein each of R and $R_1$ is methyl.

4. A polymeric substance as claimed in claim 2, wherein R is methyl and $R_1$ is ethyl.

5. The preparation of a polymeric substance, which comprises allowing a 1,2-vicinal epihalohydrin of an aliphatic polyol having from 3 to 6 carbon atoms to react under aqueous alkaline conditions with a methylene bis(5-substituted hydantoin) having the general formula

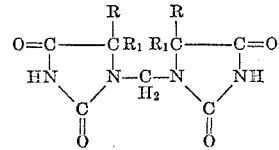

wherein R is a member of the class consisting of hydrogen and a monovalent substituent inert to alkali, to reaction with formaldehyde, and to reaction with a said epihalohydrin; $R_1$ is a monovalent substituent inert to alkali, to reaction with formaldehyde, and to reaction with a said epihalohydrin; and when none of R and $R_1$ is separately substituted, R and $R_1$ jointly are a divalent lower alkylene radical having from one to seven carbon atoms; in the proportion of from one to about 2.5 moles of the halohydrin per mole of the methylene bis-hydantoin; said aqueous alkaline conditions being provided by dispersing in water an inorganic alkaline compound of a metal whose halide is soluble in water, and which metal forms the corresponding metal salt of methylene bis-hydantoin.

6. The preparation as claimed in claim 5, wherein there are used from about 1.1 to about 1.6 moles of the said epihalohydrin per mole of the methylene bis-hydantoin.

7. The preparation as claimed in claim 5, wherein the alkaline conditions are provided by dissolving in water an inorganic alkaline compound of a metal, the halide of which is water-soluble, and in an amount at least sufficient to form a water-soluble halide of said metal with the halogen in the quantity of the said epihalohydrin used.

8. The preparation as claimed in claim 7, wherein the alkaline compound is an alkali metal hydroxide.

9. The preparation as claimed in claim 7, wherein the concentration of the alkali metal hydroxide in the water is at least about three percent, and the quantity of the hydroxide is at least slightly in excess over that needed to form said water-soluble halide.

10. The preparation as claimed in claim 7, wherein the alkali hydroxide is sodium hydroxide in a concentration of from about three to about twelve percent.

11. The preparation as claimed in claim 7, wherein the alkali hydroxide is potassium hydroxide in a concentration from about three to about 16.5 percent.

12. The preparation as claimed in claim 5, wherein the said epihalohydrin is an epihalohydrin derived from glycerine.

13. The preparation as claimed in claim 12, wherein the methylene bis(substituted hydantoin) is methylene bis(5,5-di-lower alkyl hydantoin).

14. The preparation as claimed in claim 12, wherein the methylene bis-hydantoin is methylene bis(5,5-dimethylhydantoin) and the epihalohydrin is epichlorhydrin.

15. The preparation of a polymeric substance from a 1,2-vicinal-epihalohydrin of an aliphatic polyol having from 3 to 6 carbon atoms and a methylene bis(mono- to di-substituted hydantoin) of the general formula

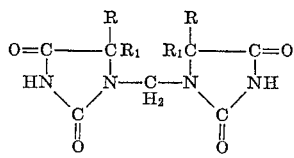

wherein R is a member of the class consisting of hydrogen and a monovalent substituent inert to alkali, to reaction with formaldehyde, and to reaction with the said epihalohydrin of an aliphatic polyol; $R_1$ is a monovalent substituent inert to alkali, to reaction with formaldehyde and to reaction with the said epihalohydrin; and when none of R and $R_1$ is separately substituted, R and $R_1$ jointly are a divalent lower alkylene radical having from one to seven carbon atoms; which method comprises preparing an aqueous solution of an inorganic alkaline compound of a metal whose halide is soluble in water, and which metal can form a water-soluble salt of said methylene bis(substituted hydantoin), and in a concentration of at least about three percent; adding the methylene bis(5-mono- to di-substituted hydantoin), and allowing said metal salt of it to form and dissolve in the water; and adding to the resulting aqueous solution the 1,2-vicinal-epihalohydrin of an aliphatic polyol having from 3 to 6 carbon atoms and in the proportion of from one to about 2.5 moles thereof per mole of said methylene bis-hydantoin; the quantity of the alkaline compound being at least sufficient to form its halide with the halogen in the quantity of the said epihalohydrin used.

16. The preparation as claimed in claim 15, wherein tthe methylene bis-hydantoin is methylene bis(5,5-di-lower alkyl hydantoin).

17. The preparation of a polymeric substance from an epihalohydrin having three to six carbon atoms and a methylene bis(5,5 - di - lower alkyl hydantoin), which method comprises preparing an aqueous solution of an inorganic alkaline compound of a metal whose halide is soluble in water, and which metal can form a water-soluble salt of said methylene bis(5,5-di-lower alkyl hydantoin), in a concentration of at least about three percent; adding the methylene bis(5,5-di-lower alkyl hydantoin) and allowing said metal salt of it to form and dissolve in the water; adding to the resulting aqueous solution the epihalohydrin in the proportion of from one to about 2.5 moles thereof per mole of said methylene bis-hydantoin; the quantity of the alkaline compound being at least sufficient to form its halide with the halogen in the quantity of the halohydrin used.

18. The preparation as claimed in claim 17, wherein the alkaline compound is an alkali metal hydroxide.

19. The preparation as claimed in claim 18, wherein the hydantoin is methylene bis(5,5-dimethyl hydantoin), the halohydrin is epichlorhydrin, and the alkali metal hydroxide is a member of the class consisting of sodium hydroxide and potassium hydroxide.

20. The preparation as claimed in claim 18, wherein heat is applied to the aqueous alkaline solution to bring it to at least about 25° C. to enhance the reaction between the two organic reactants.

21. The preparation as claimed in claim 20, wherein the heat is applied to the aqueous alkaline solution before addition of the halohydrin.

22. The preparation as claimed in claim 15, wherein the reaction is carried out in two stages, in the first of which is used only part of the inorganic alkaline compound, within the range of from about one quarter to about one half of the total amount needed relative to the quantity of the epihalohydrin used; and letting the reaction continue until liberation of heat of reaction between the epihalohydrin and said methylene bis hydantoin has about terminated; and then adding the balance of the alkaline compound and heating the reaction mixture and holding it at elevated temperature until the reaction is substantially completed.

23. The preparation as claimed in claim 22, wherein said balance of the alkaline compound is added in separate portions at intervals to avoid undesirably rapid increase in reaction temperature by the exothermic nature of the reaction.

24. The preparation as claimed in claim 22, wherein the alkaline compound is an alkali metal hydroxide.

25. The preparation as claimed in claim 24, wherein the alkali metal hydroxide is potassium hydroxide.

26. An ester of at least one fatty acid of those of vegetal origin and a polymeric substance as claimed in claim 1.

27. An ester as claimed in claim 26, wherein said at least one fatty acid is unsaturated and said ester is soluble in at least one member of the class consisting of toluene and xylene.

28. An ester of (a) a mixture of fatty acids of vegetal origin containing the fatty acids of soyabean oil to the extent of from about 60 to 100 percent, and (b) a polymeric substance as claimed in claim 1; said ester being soluble in at least one member of the class consisting of toluene and xylene.

29. An ester as claimed in claim 28, wherein the fatty acids used in its preparation constitute from about 49.5 to about 52.5 percent of the total weight of said fatty acids and said polymeric substance used in preparing said ester.

30. An ester as claimed in claim 29, wherein said fatty acids consist of (a) from none to about 10 percent of a dimer acid which is a liquid product consisting essentially of about 87 percent of a $C_{36}$ aliphatic dibasic acid and about 13 percent of $C_{54}$ aliphatic tribasic acid, and formed through the polymerization of unsaturated fatty acids at the mid-molecule, and having only a trace of monobasic acid and dimer-trimer molar ratio of about 7 to 1; and (b) the balance is the fatty acids of soyabean oil.

31. An ester as claimed in claim 30, which contains by weight from about 0.04 to about 0.16 percent of chemically bound zinc, which ester has the property that a film of it, remaining after the evaporation of the solvent from brushing a solution of it dissolved to the extent of about 50 percent of solids in xylene and without addition of any top drier, is dry-to-touch within from about 10 minutes to about half an hour of air drying at a temperature of at least about 21° C.

32. The method of preparing an ester which has the property that a film of it, remaining after the evaporation of the solvent from brushing a solution of it dissolved to the extent of about 50 percent of solids in xylene and without addition of any top drier, is set-to-touch within from about 10 minutes to about half an hour of air drying at a temperature of at least about 21° C.; which method comprises esterifying under esterifying temperature conditions in the presence of a zinc salt esterification promoter in a catalytically effective amount and in a suitable quantity of a hydrocarbon water-entrainer inert to the reactants, (a) a polymeric substance as claimed in claim 1 in about equal proportions by weight with (b) a mixture of the fatty acids of soyabean oil, which contains from none to about 10 percent by weight of said mixture of a dimer acid which is a liquid product consisting essentially of about 87 percent of a $C_{36}$ aliphatic dibasic acid and about 13 percent of $C_{54}$ aliphatic tribasic acid, and formed through the polymerization of unsaturated fatty acids at the mid-molecule, and having only a trace of monobasic acid and dimer-trimer molar ratio of about 7 to 1; and conducting said esterification in the absence of any top driers and until the acid number of the esterification mixture is low enough to indicate a practical completion of the esterification.

References Cited

UNITED STATES PATENTS

| 2,999,827 | 9/1961 | McGary et al. | 260—18 X |
| 2,418,000 | 3/1947 | Walker | 260—309.5 |

FOREIGN PATENTS 850,811  9/1952  Germany.

DONALD E. CZAJA, *Primary Examiner.*

C. W. IVY, *Assistant Examiner.*